(12) United States Patent
Wagner et al.

(10) Patent No.: US 8,377,326 B2
(45) Date of Patent: Feb. 19, 2013

(54) USE OF POLYAMINO AND/OR POLYAMMONIUM-POLYSILOXANE-COPOLYMER COMPOUNDS

(75) Inventors: Roland Wagner, Bonn (DE); Albert Schnering, Koln (DE); Karl-Heinz Sockel, Leverkusen (DE); Annette Moller, Leverkusen (DE); Anita Witossek, Langenfeld (DE); Christopher Roos, Monheim (DE); Jurgen Krott, Leverkusen (DE)

(73) Assignee: Momentive Performance Materials GmbH, Leverkusen (DE)

( * ) Notice: Subject to any disclaimer, the term of this patent is extended or adjusted under 35 U.S.C. 154(b) by 26 days.

(21) Appl. No.: 12/922,857

(22) PCT Filed: Mar. 5, 2009

(86) PCT No.: PCT/EP2009/052595
§ 371 (c)(1),
(2), (4) Date: Nov. 5, 2010

(87) PCT Pub. No.: WO2009/115412
PCT Pub. Date: Sep. 24, 2009

(65) Prior Publication Data
US 2011/0037012 A1 Feb. 17, 2011

(30) Foreign Application Priority Data
Mar. 18, 2008 (DE) .......................... 10 2008 014 761

(51) Int. Cl.
*D06M 15/643* (2006.01)

(52) U.S. Cl. .................. 252/8.61; 252/8.63; 424/70.11; 424/70.122; 428/452; 528/25; 528/26; 528/38

(58) Field of Classification Search ........................ None
See application file for complete search history.

(56) References Cited

U.S. PATENT DOCUMENTS

| 7,718,268 | B2 * | 5/2010 | Guth et al. | .................... 428/447 |
| 7,863,397 | B2 * | 1/2011 | Lange et al. | .................... 528/28 |
| 7,897,716 | B2 * | 3/2011 | Wagner et al. | .................... 528/28 |
| 2006/0223939 | A1 | 10/2006 | Lange et al. | |
| 2006/0235181 | A1 | 10/2006 | Lange et al. | |

FOREIGN PATENT DOCUMENTS

| DE | 10214290 | | 10/2003 |
| WO | WO 03/095735 | * | 11/2003 |
| WO | WO 2004/090007 | * | 10/2004 |
| WO | WO 2004/101684 | * | 11/2004 |
| WO | WO 2009/061364 A2 | * | 5/2009 |

OTHER PUBLICATIONS

International Search Report for corresponding PCT/EP2009/052595 mailed Jun. 18, 2009, two pages.

* cited by examiner

*Primary Examiner* — Marc Zimmer
(74) *Attorney, Agent, or Firm* — Rankin, Hill & Clark LLP

(57) ABSTRACT

The invention relates to the use of polyamino and/or polyammonium-polysiloxane-copolymer compounds or aqueous emulsions thereof for of the first finishing of fibrous materials, aqueous emulsions of the polyamino and/or polyammonium-polysiloxane-copolymer compounds, as well as a method for the first finishing of fibrous materials.

18 Claims, No Drawings

USE OF POLYAMINO AND/OR POLYAMMONIUM-POLYSILOXANE-COPOLYMER COMPOUNDS

The invention relates to the use of polyamino and/or polyammonium-polysiloxane-copolymer compounds or aqueous emulsions thereof for the first finishing of fibrous materials, aqueous emulsions of the polyamino and/or polyammonium-polysiloxane-copolymer compounds, as well as a method for the first finishing of fibrous materials.

Polysiloxanes containing amino groups are known as textile softeners (EP 441 530).

Moreover, it is known to react $\alpha,\omega$-epoxy-modified siloxanes with $\alpha,\omega$-amino-functionalized alkyleneoxides, and to use these products as hydrophilic softeners (U.S. Pat. Nos. 5,807,956, 5,981,681). In developing this idea, block copolymers have been proposed in which $\alpha,\omega$-epoxy-modified siloxanes and $\alpha,\omega$-epoxy-modified polyethers are connected to one another via primary alkylamines as chain extenders (U.S. Pat. No. 6,475,568). Greater softness and capacity for substrate wetting are mentioned as advantages of these compounds.

Aminosiloxanes with ethyleneoxid-/propyleneoxid units in the side chains have also been described (U.S. Pat. Nos. 5,591,880, 5,650,529).

An increased substantivity is expected from polysiloxane quats ("polysiloxane quats"=polysiloxanes containing quaternary ammonium groups). The reaction of $\alpha,\omega$-diepoxides with tertiary amines in the presence of acids is known; it supplies $\alpha,\omega$-di-quaternary siloxanes, which can be used for hair care purposes (DE-A 37 19 086). Besides tetraalkyl-substituted quaternary ammonium structures, aromatic imidazolinium derivatives are also claimed.

The tendency to being washed out of hair can be reduced if the $\alpha$-$\omega$-diepoxides are reacted with di-teritiary amines in the presence of acids to form long-chained polyquaternary polysiloxanes (EP-A-282720). Aromatic quaternary ammonium structures are not disclosed.

Such polyquaternary imidazolinium derivatives are discussed in U.S. Pat. No. 6,240,929. These cationic compounds are supposed to have a further increased compatibility with regard to the anionic surfactants present in cosmetic formulations. However, the resistance to being washed out relates to the short-term impact of, primarily, water and very mild surfactants that do not irritate the skin, whereas hydrophilic softeners for textiles resistant to washing have to resist the impact of concentrated surfactant solutions with a high capacity of removing fat and dirt. The problem is compounded by the fact that modern laundry detergents contain strongly alkaline complexing agents, bleaching agents with an oxidizing action and complex enzyme systems, and that the fibers are often subjected to the action for hours at increased temperatures.

Hydrophilicity is supposed to be increased by introducing alkyleneoxide groups in addition to the quaternary ammonium structures.

Strictly comb-like polysiloxane quats, that is, polysiloxane quats that are alkyleneoxide-modified in the side groups of the siloxane units have also been described. The hydroxyl groups of comb-like substituted polyether siloxanes are transferred into the corresponding chlorine derivatives with epicholorhydrine (U.S. Pat. No. 5,098,979) and chloroacetic acid (U.S. Pat. Nos. 5,153,294, 5,166,297). A quaternization with tertiary amines is carried out subsequently. The drawback of the solutions according to U.S. Pat. Nos. 5,098,979, 5,153,294 and 5,166,297 is that, due to the alkyleneoxide units, the quat groups are positioned at a large distance from the main chain, whereby the substantivity of the entire molecule is decreased.

Branched alkyleneoxide-modified polysiloxane quats have been synthesized from $\alpha,\omega$-OH-terminated polysiloxanes and trialkoxysilanes by means of condensation. The quaternary ammonium structure is introduced via the silane, wherein the quaternary nitrogen atom is substituted by alkyleneoxide units (U.S. Pat. No. 5,602,224). The drawback of this solution is that the link between the quat content and the degree of branching is not very flexible.

$\alpha,\omega$-difunctional siloxane derivatives are described in U.S. Pat. No. 6,242,554, each of which possesses separate quaternary ammonium and alkyleneoxide units. However, these mono-quaternary compounds are not sufficiently substantive.

In WO 02/10257 and WO 02/10259, polyquaternary polysiloxane block copolymers are being claimed as advanced softeners, which enable the softening of textiles during finishing and, alternatively, during the washing process from detergent formulations. US 2002/0103094 A discusses the use of the above-mentioned silicone materials in textile care formulations. WO 02/10257, WO 02/10259 and US 2002/0103094 A disclose materials in which the quat groups are present partially or completely separated from the alyleneoxide units. These alyleneoxide units are incorporated into the block copolymer as $\alpha,\omega$-difunctional units.

Branched polyquaternary polysiloxane block copolymers are described in WO 03/78504 as permanent textile softeners. Among others, trifunctional alkyleneoxide structures that are present separately from the quat groups can be incorporated as branching unit. Due to their cross-linking properties, these trifunctional alkyleneoxide can only be introduced to a limited extent.

Reactively functionalized branched polyquaternary polysiloxane block copolymers are described in WO 2004/090007 as permanent textile softeners.

Polyquaternary polysiloxane block copolymers with polyether side groups are described in WO 2006/103075 as permanent textile softeners.

Octopus-like polyquaternary polysiloxane block copolymers are described in WO 2007/014930 as permanent textile softeners.

Based on this state of the art, a further improvement of hydrophilicity of the silicone-based block copolymers, without relinquishing the softness of the treated fibers that can be achieved, in particular with the same or improved substantivity (adherence of the siloxane systems/molecules to the fiber), flexibility in formulating the siloxane systems/compositions and the form of administration, is very desirable, in particular with respect to decreasing the required deployed quantities and the materials costs.

It is therefore an object of the invention to provide the use of polyquaternized siloxane block copolymers for the first finishing of textiles and other natural and synthetic fibrous materials, such as, for example, paper fibers, wool and hair, wherein such materials or substrates, preferably textile materials, are given a softness typical for silicone, improved elasticity and a decreased tendency to crease at increased hydrophilicity.

It is another object of the invention to provide a new use of the substances of the present invention as constituents of systems for the first finishing of textiles or the finishing of other fibrous substrates.

Surprisingly, it was found that the above-described objects can be achieved by using the polyamino and/or polyammonium-polysiloxane-copolymer compounds comprising repeating units of the formula (I):

$$-[Q-V]-\qquad\qquad (I)$$

wherein Q is selected from the group consisting of:
—NR—,
—N⁺R₂—
a saturated or unsaturated diamino-functional heterocycle of the formulae:

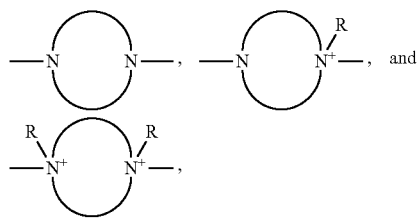

as well as an aromatic diamino-functional heterocycle of the formula:

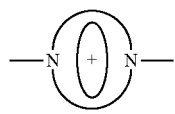

a trivalent residue of the formula:

a trivalent residue of the formula:

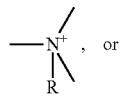

a tetravalent residue of the formula:

wherein R respectively represents hydrogen or a monovalent organic residue,
wherein Q does not bond to a carbonyl carbon atom,
V is selected from the group consisting of $V^{11}$, $V^{12}$, $V^2$ and $V^3$, wherein
$V^2$ is selected from divalent, straight-chained, cyclic or branched, saturated, unsaturated or aromatic hydrocarbon residues with up to 1000 carbon atoms (wherein the carbon atoms of the polysiloxane residue $Z^2$ defined below are not included in this number), which may optionally contain one or more groups selected from
—O—,
—CONH—,

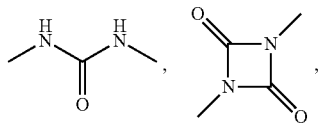

—CONR²—, wherein
$R^2$ represents hydrogen, a monovalent, straight-chained, cyclic or branched, saturated, unsaturated or aromatic hydrocarbon residue with up to 100 carbon atoms, which may contain one or more groups selected from
—O—,
—NH—,
—C(O)— and
—C(S)—,
and which may optionally be substituted by one or more substituents selected from the group consisting of:
a hydroxyl group,
an optionally substituted heterocyclic group preferably containing one or more nitrogen atoms,
amino,
alkylamino,
dialkylamino,
ammonium,
polyether residues and
polyether ester residues,
wherein, if several groups —CONR² are present, they may be the same or different,
—C(O)— and
—C(S)—, and
the residue $V^2$ may optionally be substituted by one or more hydroxyl groups and/or by
—Si(OR)$_{3-a}$(R')$_a$
wherein a is an integer from 0 to 2, and R and R' may be the same or different from each other, and each represent an organic residue, and
the residue $V^2$ contains at least one group —$Z^2$— of the formula

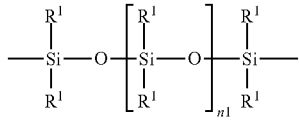

wherein
$R^1$ may be the same or different and is selected from the group consisting of:
$C_1$ to $C_{22}$-alkyl,
fluoro($C_1$-$C_{10}$)alkyl, $C_6$-$C_{10}$-aryl and
—W—Si(OR)$_{3-a}$(R')$_a$, wherein
R, R' and a are defined as above, and
W is
—O— or
a divalent, straight-chained or cyclic or branched, saturated, unsaturated or aromatic hydrocarbon residue with up to 100 carbon atoms, which may contain one or more groups
—C(O)—,
—O—,
—NH—, and
—S— and
may optionally be substituted by hydroxyl groups, and $n_1$=20 to 52, $V^{11}$ is selected from divalent, straight-chained, cyclic or branched, saturated, unsaturated or aromatic hydrocarbon residues with up to 1000 carbon atoms, which may optionally contain one or more groups selected from
—O—,
—CONH—,

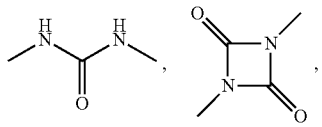

—CONR$^2$—, wherein
  R$^2$ is as defined above, wherein the groups R$^2$ in the groups V$^{11}$ and V$^2$ may be the same or different,
—C(O)—,
—C(S)— and
—Z$^1$—, wherein
  —Z$^1$— is a group of the formula

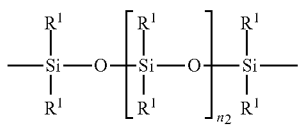

wherein
  R$^1$ is as defined above, wherein the groups R$^1$ in the groups V$^{11}$ and V$^2$ may be the same or different, and $n_2$=0 to 19, and
the residue V$^{11}$ may optionally be substituted by one or more hydroxyl groups and/or by
  —Si(OR)$_{3-a}$(R')$_a$
  wherein a is an integer from 0 to 2, and R and R' may be the same or different from each other, and each represent an organic residue,
provided that the residue V$^{11}$ comprises (poly)alkyleneoxide units, V$^{12}$ is selected from divalent, straight-chained, cyclic or branched, saturated, unsaturated or aromatic hydrocarbon residues with up to 1000 carbon atoms, which may optionally contain one or more groups selected from
—O—,
—CONH—,

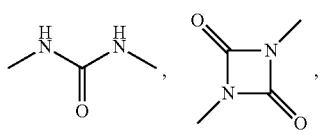

—CONR$^2$—, wherein
  R$^2$ is as defined above, wherein the groups R$^2$ in the groups V$^{12}$ and V$^2$ may be the same or different,
—C(O)—,
—C(S)— and
—Z$^1$—, wherein
  —Z$^1$— is a group of the formula

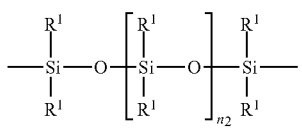

wherein
  R$^1$ is as defined above, wherein the groups R$^1$ in the groups V$^{12}$ and V$^2$ may be the same or different, and $n_2$=0 to 19, and the residue V$^{12}$ may optionally be substituted by one or more hydroxyl groups and/or by
  —Si(OR)$_{3-a}$(R')$_a$
  wherein a is an integer from 0 to 2, and R and R' may be the same or different from each other, and each represent an organic residue,
provided that the residue V$^{12}$ comprises no (poly)alkyleneoxide units,
and
V3 represents a tri- or higher-valent, straight-chained, cyclic or branched, saturated, unsaturated or aromatic hydrocarbon residue with up to 1000 carbon atoms, which may optionally contain one or more groups selected from
—O—,
—CONH—,

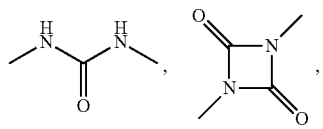

—CONR$^2$—, wherein R$^2$ is as defined above,
—C(O)—,
—C(S)—,
—Z$^1$—, which is as defined above,
—Z$^2$— which is as defined above, and
Z$^3$, wherein Z$^3$ is a tri- or higher-valent organopolysiloxane unit, and
which may optionally be substituted by one or more hydroxyl groups and/or by
  —Si(OR)$_{3-a}$(R')$_a$
wherein a is an integer from 0 to 2, and R and R' maybe the same or different from each other, and each represent an organic residue,
provided that
the polyamino and/or polyammonium-polysiloxane-copolymer compounds contain at least one residue V$^{11}$ and at least one residue V$^{12}$,
the above-mentioned polyamino and/or polyammonium-polysiloxane-copolymer compounds contain at least one group —Z$^1$—, —Z$^2$—or Z$^3$, and
that the tri- and tetravalent residues Q either serve for branching the main chain formed from Q and V, so that the valences which do not serve for bonding in the main chain carry further branchings formed from -[Q-V]— units, or the tri- and tetravalent residues Q are saturated with residues V$^3$ within a linear main chain without forming a branching, and
wherein the positive charges resulting from ammonium groups are neutralized by organic or inorganic acid anions,
for the first finishing of fiber materials.

In a preferred embodiment of the invention, the polysiloxane compound of the formula (I) contains V$^2$, V$^{11}$ and V$^{12}$ units.

The group R in the definition of Q is preferably selected from the groups R$^2$.

Preferred embodiments of Q are:
For residues of the formula

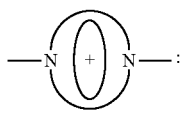

a quaternized imidazole unit of the structure

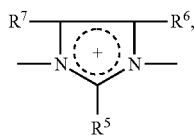

a quaternized pyrazole unit of the structure

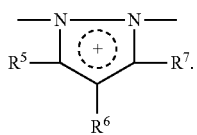

For residues of the formula

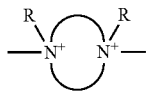

a diquaternized piperazine unit of the structure

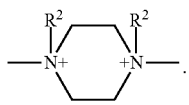

For residues of the formula

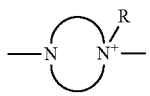

a monoquaternized piperazine unit of the structure

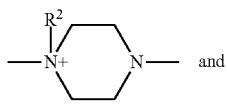 and a monoquaternized piperazine unit of the structure

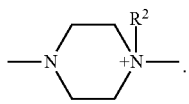

For residues of the formula

a residue of the formula —N⁺R₂—, wherein R represents a monovalent, straight-chained, cyclic or branched, saturated hydrocarbon residue with up to 20 carbon atoms, which may contain one or more groups selected from
—O—,
—NH—,
—C(O)— and
—C(S)—,
and which may optionally be substituted by one or more hydroxyl groups, and
a diquaternized unit of the structure

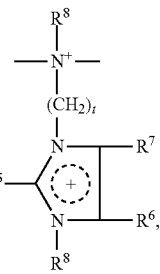

a monoquaternized unit of the structure

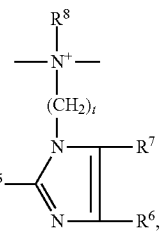

a diquaternized unit of the structure

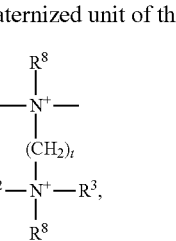

and a monoquaternized unit of the structure

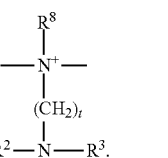

For residues of the formula

—NR— a monoquaternized unit of the structure

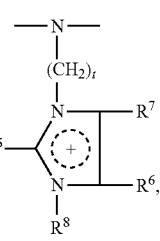

a monoquaternized unit of the structure

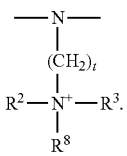

wherein:

t is 2 to 10,

R is as defined above, preferably $R^2$, $R^2$ is as defined above, and the meaning of $R^2$ can be the same as or different from the meaning of the above group $R^2$, $R^3$ has the meaning of $R^2$, wherein $R^2$ and $R^3$ may be the same or different, or $R^2$ and $R^3$, together with the positively charged nitrogen atom, can form a five- to seven-membered heterocycle which may additionally comprise one or more nitrogen, oxygen and/or sulfur atoms, $R^5$, $R^6$, $R^7$ may be the same or different and are selected from the group consisting of:

H, halogen, hydroxyl group, nitro group, cyano group, thiol group, carboxyl group, alkyl group, monohydroxyalkyl group, polyhydroxyalkyl group, thioalkyl group, cyanoalkyl group, alkoxy group, acyl group, acetyloxy group, cycloalkyl group, aryl group, alkylaryl group, and groups of the type —$NHR^W$, in which $R^W$ denotes H, alkyl group, monohydroxyalkyl group, polyhydroxyalkyl group, acetyl group or a ureido group, and in each case two of the adjacent residues $R^5$, $R^6$ and $R^7$, together with the carbon atoms bonding them to the heterocycle, can form aromatic five- to seven-membered rings, and $R^8$ has the meaning of $R^2$, wherein $R^8$ and $R^2$ may be the same or different, or In case Q represents a trivalent residue of the formulae

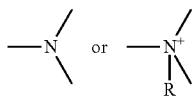

or a tetravalent residue

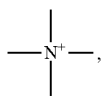

these residues, in the linear copolymers of the formula (I), preferably do not serve for branching the polysiloxane copolymers, but the residues are exclusively bonded to, in particular, trivalent residues $V^3$, wherein cyclic structures are formed that are constituents of the linear main chain, such as, for example, a structural element of the formula:

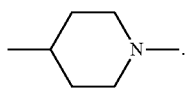

In a preferred embodiment of the invention, the polyamino and/or polyammonium-polysiloxane-copolymer compounds have the formula (II):

wherein Q and $V^2$ are defined as above, $V^1$ is selected from at least one group $V^{11}$ and at least one group $V^{12}$, and the ratio of w to v is from 0.05 to 10.

More preferably, the ratio of w to v=0.1 to 5, still more preferably 0.3 to 2.

In combination with setting the chain length of the polydiorganosiloxane residue, by setting the ratio of the group $V^2$, which comprises the comparatively long-chained polydiorganosiloxane residue, and the group $V^1$, which does not comprise a long-chained polydiorganosiloxane residue, the hydrophilicity, softness and feel of the fibrous materials achieved with the textile first finishing according to the invention can be optimized with respect to an excellent balance.

In addition, a further optimization with respect to the textile first finishing may be carried out by using polyalkyleneoxide-containing residues $V^{11}$ and non-polyalkyleneoxide-containing residues $V^{12}$. The result of using said residues $V^{11}$ and $V^{12}$ are, in particular, polyamino and/or polyammonium-polysiloxane-copolymer compounds of the formula (III):

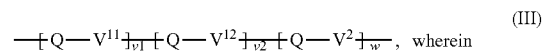

Q, $V^{11}$, $V^{12}$ and $V^2$ are defined as above, and v1+v2=v. The molar ratio v1 to v2 in mol-% can be between 0 to 100 (>0 and <100), relative to the total amount of v1 and v2. Preferably, the molar ratio of v1 to v2 in mol-% is in the range of from 5 to 95 mol-%. If the mole ratio of v1/v2<5%, the hydrophilicity of the polyamino and/or polyammonium-polysiloxane-copolymer compounds used according to the invention can be reduced. If the mole ratio of v1/v2>95%, the hydrophilicity of the polyamino and/or polyammonium-polysiloxane-copolymer compounds used according to the invention can be high, with a risk being present, however, of the substantivity being reduced and the soft feel being impaired.

The inventors of the present invention moreover found that the ratio of $V^2$ to $V^{11}$ corresponding to w to v1 in mol-% has a particular significance in the first finishing of textiles. Preferably, the molar ratio of the groups $V^2$ to $V^{11}$ corresponding to w to v1 in mol-% is from 50 to 99.9, more preferably 80 to 99, still more preferably 85 to 97, in each case mol-% relative to the sum of w and v1.

The polyamino and/or polyammonium-polysiloxane-copolymer compounds used according to the invention generally comprise, on average, two, more preferably three repeating units of the formula (I).

In a preferred embodiment of the polysiloxane compounds of the formula (I), $V^2$ represents a group of the formula

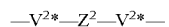

wherein $Z^2$ is as defined above and $V^{2*}$ represents a divalent, straight-chained, cyclic or branched, saturated, unsaturated or aromatic hydrocarbon residue with up to 40 carbon atoms, which may optionally contain one or more groups selected from —O—, —CONH—, —$CONR^2$—, wherein $R^2$ is as defined above, —C(O)— and —C(S)—, and the residue $V^{2*}$ may optionally be substituted by one or more hydroxyl groups.

In the above-mentioned embodiment, the preferably linear polysiloxane copolymer used according to the invention may comprise the following repeating units:

—[$V^{2*}$—$Z^2$—$V^{2*}$-Q]-preferably together with —[$V^1$-Q]-.

In a preferred embodiment of the polysiloxane compound of the formula (I) used according to the invention, the group $V^1$ is selected from divalent, straight-chained, cyclic or branched, saturated, unsaturated or aromatic hydrocarbon residues with up to 600, preferably up to 400 carbon atoms, which may optionally contain one or more groups selected from —O—, —CONH—,

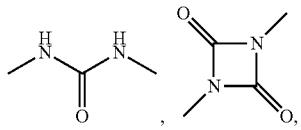

—CONR$^2$—,
wherein R$^2$ is as defined above, —C(O)—, —C(S)— and —Z$^1$-, wherein —Z$^1$-is a group of the formula

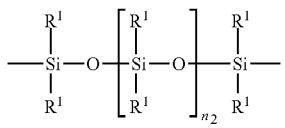

wherein
R$^1$ is C$_1$-C$_{18}$ alkyl, which may optionally be substituted with one or more fluorine atoms, or phenyl, and n$_2$ is as defined above.

In another preferred embodiment of the polysiloxane compounds of the formula (I), the group Q is selected from:

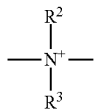

wherein R$^2$ is as defined above, preferably H or alkyl, preferably with 1 to 6 carbon atoms, and R$^3$ has the meaning of R$^2$ and is preferably H, alkyl, preferably with 1 to 6 carbon atoms or R$^O$, wherein the residue R$^O$ represents a group of the formula (IV):

—X-E—Y   (IV), wherein X represents a single bond or a divalent, straight-chained, branched or cyclic hydrocarbon residue with up to 20 carbon atoms, which may optionally contain nitrogen and/or oxygen, and X is connected with the nitrogen atom of Q via a carbon atom,
E represents a polyalkylene residue of the formula —[(C$_a$H$_{2a}$)O]$_y$— wherein a=2 to 4, and
y=2 to 10000, preferably y=1-2,
which is connected with the group X via a carbon atom and with the group Y via an oxygen atom,
Y represents hydrogen or a monovalent, straight-chained, branched or cyclic, saturated, unsaturated or aromatic hydrocarbon residue with up to 24 carbon atoms, which may contain oxygen and/or nitrogen and/or halogen and is connected with the group E via a carbon atom.
Preferably, R$^O$ is a group of the formula (III), in which -E- represents a group of the formula (V):

wherein it may be random or block-like sequences of the ethylene and propylene units and the bond to E can take place via an ethylene and propylene unit, the representation of group (V) thus being only quantitative,
with
v=1 to 200, preferably y=1-2,
w=0 to 200, preferably =0,
v+w≧1.
Furthermore, in the group of the formula (IV), Y is preferably selected from H or straight-chained, cyclic, branched C$_1$ to C$_{22}$-alkyl-, alkenyl-, alkinyl-, fluoro(C$_1$-C$_{10}$)alkyl- and C$_6$-C$_{10}$-aryl residues.
Particularly preferably,

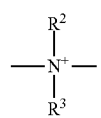

stands for —NH$_2^+$—, —N(CH$_3$)$_2^+$—, —(NHR$^O$)$^+$—,
V$^{2*}$ preferably represents a divalent, straight-chained, cyclic or branched, saturated, unsaturated or aromatic hydrocarbon residues with up to 16 carbon atoms, which may optionally contain one or more groups selected from —O—, —CONH—, —CONR$^2$—, wherein R$^2$ is as defined above, —C(O)— and —C(S)—, and may optionally be substituted by one or more hydroxyl groups. More preferably, —V$^{2*}$— is selected from the groups of the formulae:

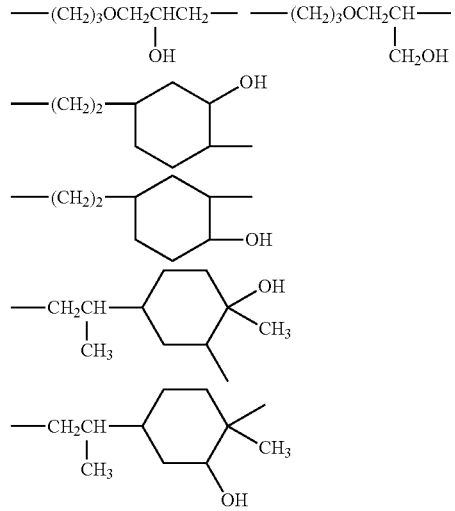

The polyamino and/or polyammonium-polysiloxane-copolymer compounds according to the invention contain at least one (poly)alkyleneoxide-free unit V$^{12}$ and at least one (poly)alkyleneoxide-containing unit V$^{11}$.
The term (poly)alkyleneoxide-containing means that the residue V$^{11}$ contains at least one alkylene ether group or (poly)alkylene ether group. The alkylene ether group may in this case also be part of an ester group, such as, for example, in the group of the formula:
—(CH$_2$)$_u$C(O)O—R$^9$—O—C(O)(CH$_2$)$_u$—, wherein the alkylene ether group is formed by the group
—R$^9$—O— or —O—R$^9$—.
Conversely, the term (poly)alkyleneoxide-free means that the residue V$^{12}$ contains no alkylene ether group or (poly)alkylene ether group.

$V^{12}$ is therefore preferably selected from divalent, straight-chained, cyclic or branched, saturated, unsaturated or aromatic hydrocarbon residues with up to 100 carbon atoms, which may optionally contain one or more groups selected from
—$Z^1$—, wherein
—$Z^1$— is a group of the formula

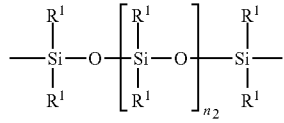

wherein
$R^1$ is as defined above, wherein the groups $R^1$ in the groups $V^{12}$ and $V^2$ may be the same or different, and $n_2=0$ to 19, and
the residue $V^{12}$ may optionally be substituted by one or more hydroxyl groups and/or by
—$Si(OR)_{3-a}(R')_a$
wherein a is an integer from 0 to 2, and R and may be the same or different from each other, and each represent an organic residue.

$V^{12}$ more preferably represents
—$R^9$—, wherein $R^9$ represents a divalent, saturated or mono- or polyunsaturated, straight-chained or branched hydrocarbon residue with two to 25 carbon atoms, $V^{11}$ preferably represents
—$(CH_2)_uC(O)O$—$[(CH_2CH_2O)_q$—$(CH_2CH(CH_3)O)_r]$—$C(O)(CH_2)_u$—
—$(CH_2)_uC(O)O$—$R^9$—$O$—$C(O)(CH_2)_u$—, wherein $R^9$ is as defined above,
—$[CH_2CH_2O]_q$—$[CH_2CH(CH_3)O]_r$—$CH_2CH_2$—,
—$CH(CH_3)CH_2O[CH_2CH_2O]_q$—$[CH_2CH(CH_3)O]_r$—$CH_2CH(CH_3)$),
—$CH_2CH(OH)CH_2OCH_2CH(OH)CH_2OCH_2CH(OH)CH_2$— and
$CH_2CH(OH)CH_2O$—$[CH_2CH_2O]_q$—$[CH_2CH(CH_3)O]_r$—$CH_2CH(OH)CH_2$—
wherein
u is 1 to 3,
q and r are 0 to 5, preferably 0 to 3, and
$q+r>0$.

More preferred variants of $V^{11}$ are structures of the formula:

—$CH_2C(O)O$—$[CH_2CH_2O]_q$—$[CH_2CH(CH_3)O]_r$—$C(O)CH_2$—, —$CH_2CH_2C(O)O$—$[CH_2CH_2O]_q$—$[CH_2CH(CH_3)O]_r$—$C(O)CH_2CH_2$—,
—$CH_2CH_2CH_2C(O)O$—$[CH_2CH_2O]_q$—$[CH_2CH(CH_3)O]_r$—$C(O)CH_2CH_2CH_2$—,

Even more preferred variants of $V^{11}$ are structures of the formula:
—$CH_2C(O)O$—$[CH_2CH_2O]_q$—$[CH_2CH(CH_3)O]_r$—$C(O)CH_2$—, wherein r=0 and q=1 to 3, preferably 1 or 2 and most preferably 2.

$V^{12}$ preferably is:
—$[CH_2]_o$—
wherein o=2 to 8, more preferably o=2 to 6, most preferably =6.

According to the invention, polyamino and/or polyammonium-polysiloxane-copolymer compounds of the formula (III) are used particularly preferably:

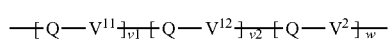  (III)

wherein at least one, preferably at least two, even more preferably all of the following features are fulfilled:
v1>0,
v2>0,
w>0,
w:v (=v1+v2), corresponding to the molar ratio of $V^2$ to $V^1$ of 0.3 to 2,
molar ratio of v1 to v2 in mol-% from 5 to 95 mol-%,
molar ratio of $V^2$ to $V^{11}$ corresponding to w to v1 in mol-% of 80 to 99, more preferably 85 to 97, in each case relative to the sum of w and v1, i.e. a molar ratio of w: v1 such as 80 to 99:20 to 1, more preferably 85 to 97: 15 to 3

$V^{11}$ preferably is a group of the formula —$CH_2C(O)O$—$[CH_2CH_2O]_q$—$C(O)CH_2$—, wherein q is 1 or 2,
$V^{12}$ is a group of the formula —$[CH_2]_o$—, wherein o=2 to 6, more preferably o=6,
$V^2$ is a group $V^{2*}$—$Z^2$—$V^{2*}$— wherein $V^{2*}$=

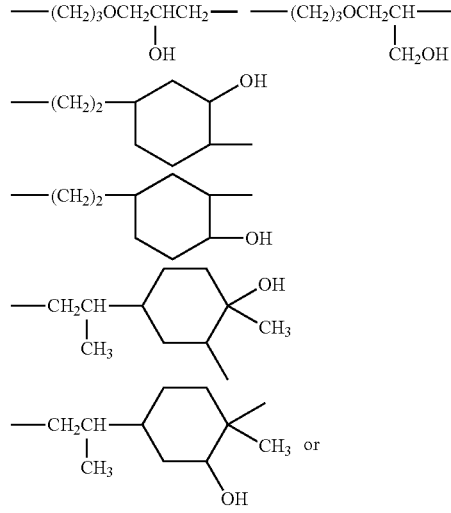

$V^{2*}$=divalent, saturated hydrocarbon residue with 1 to 10 carbon atoms, and
—$Z^2$-represents a residue of he formula

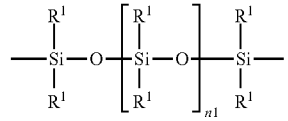

wherein
$R^1$ is $C_1$ to $C_{22}$-alkyl, preferably methyl, and
$n_1$=22 to 50, more preferably 24 to 48.

The polyamino and/or polyammonium-polysiloxane-copolymer compounds according to the invention can be prepared, in particular, by a method in which diamines are reacted with amine-reactive compounds, such as epoxy- and/or halogenalkyl-functional compounds, wherein the reacted compounds comprise at least one (poly)alkyleneoxide residue, at least one polydiorganosiloxane residue and at least one residue that leads to the formation of a residue $V^{12}$, which contains no (poly)alkyleneoxide residue.

The polysiloxane-copolymer compounds according to the invention can be such compounds that comprise amino-functions and such compounds that comprise ammonium-functions. Preferably, the polysiloxane-copolymer compounds according to the invention are polyammonium-polysiloxane-copolymer compounds. They are preferably obtained by quaternizing reaction of di-tertiary diamines with quaternizing or alkylating compounds, such as, in particular, epoxy- and/or halogenalkyl-functional compounds.

The following may be present, for example, as the anions neutralizing the positive charges resulting from the ammonium groups: halogenide ions, especially chloride and bromide, alkylsulfates, especially methosulfate, carboxylates, especially acetate, propionate, octanoate, decanoate, dodecanoate, tetradecanoate, hexadecanoate, octadecanoate, oleate, sulfonates, especially toluenesulfonate. The OH⁻ anion may also be taken into consideration as a non-neutralizing anion for the quaternized compounds. Other anions may also be introduced by means of an ion exchange. For example, organic anions, such as polyether carboxylates and polyether sulfates must be mentioned.

The polyammonium-polysiloxane-copolymer compounds according to the invention are preferably such compounds which are, for example, prepared by means of a method wherein
a) A diamine comprising a (poly)alkyleneoxide group and a diamine, comprising no (poly)alkyleneoxide group is reacted with amino-reactive polysiloxane-containing compounds, and
b) A diamine comprising no (poly)alkyleneoxide group is reacted with a amino-reactive polysiloxane-containing compound and a (poly)alkyleneoxide compound.

By suitably selecting the stoichiometry of the starting compounds, the ratio of the groups $V^{11}$, $V^{12}$ and $V^2$ in the compounds according to the invention can be controlled.

Suitable monomers introducing $V^{11}$ or $V^{12}$ include, for example alpha, omega-diamines, such as alkylenediamines or diaminopolyether. They are reacted, for example, with amino-reactive $V^2$-containing monomers, such as, for example diepoxy-polysiloxane compounds, dihalogenalkyl-polysiloxane compounds. Alternatively, $V^{11}$ or $V'^2$ can also be introduced via dihalogenalkyl compounds, diepoxide compounds or compounds with mixed groups which are reacted with amino-functional monomers, which introduce the group $V^2$ or further groups $V^{11}$ or $V^{12}$.

With regard to their preparation, reference can be made to WO 02/10257.

The polysiloxanes according to the invention of the general formula (I) may optionally also contain branching units $V^3$. Expediently, $V^3$ may be a tri- or higher-valent, straight-chained, cyclic or branched, saturated, unsaturated or aromatic hydrocarbon residue with up to 1000 carbon atoms, which may optionally contain one or more groups selected from —O—, —CONH—, —CONR²—, wherein R² is as defined above, —C(O)—, —C(S)—, —Z¹—, which is as defined above, —Z²—, which is as defined above, and Z³, wherein Z³ is a tri- or higher-valent organopolysiloxane unit. The branching unit $V^3$ can be silicone-free. Examples thereof include:

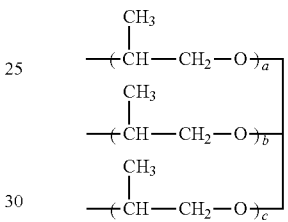

wherein a, b and c may be the same or different and be from 1 to 40,

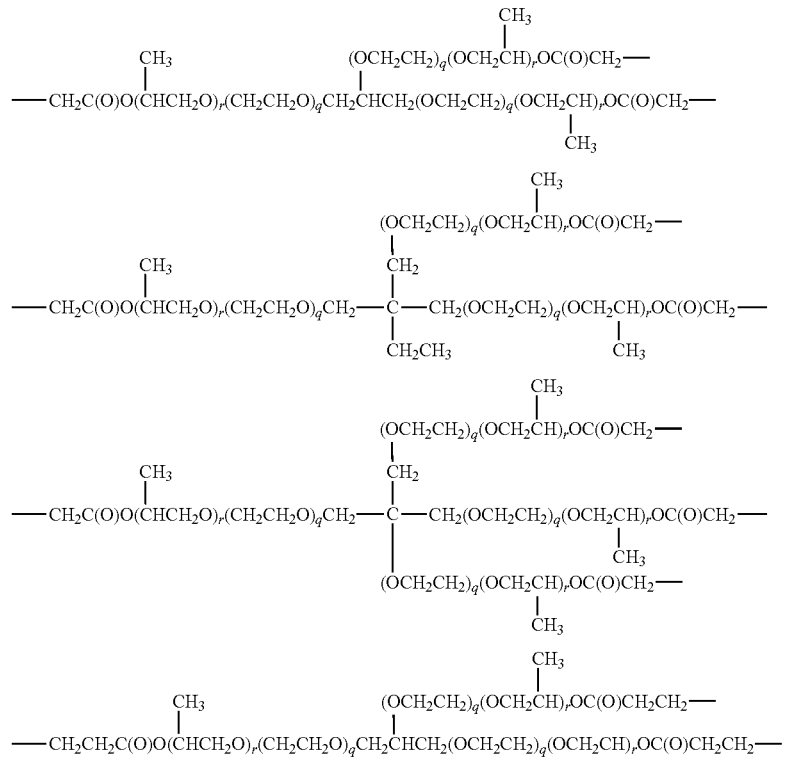

-continued

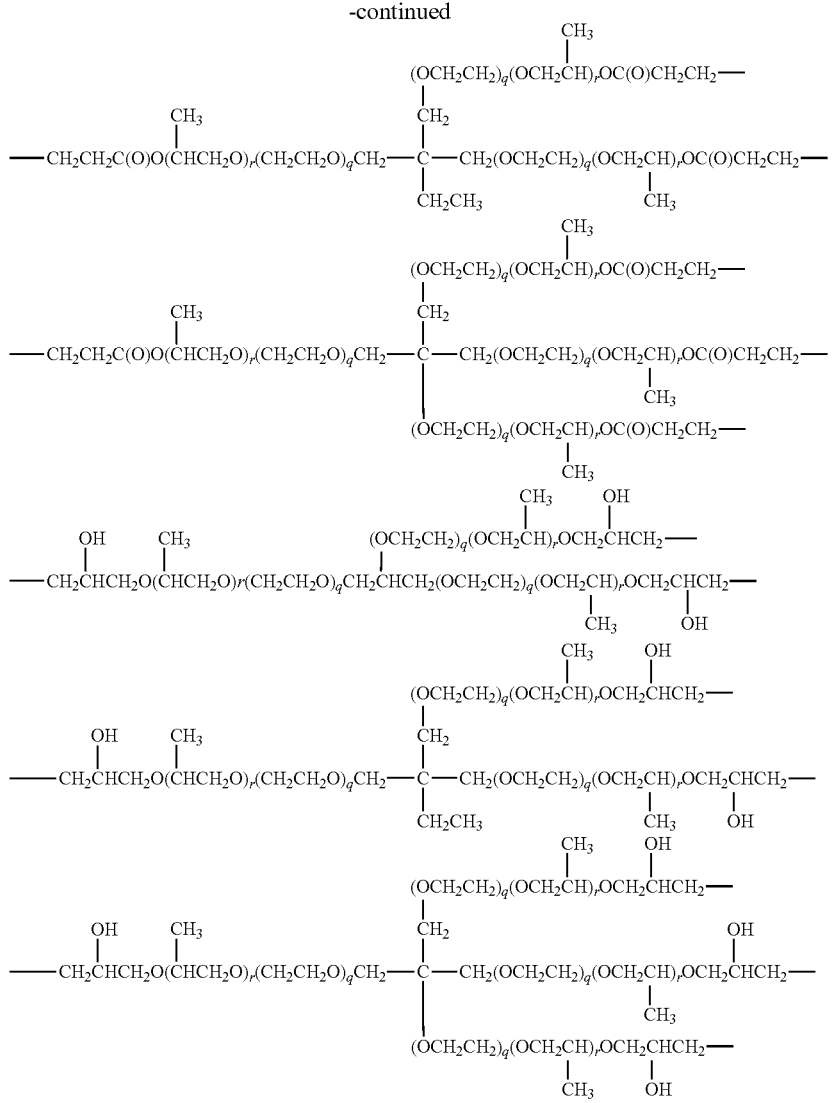

q+r≧0, wherein the arrangement of the ethylene and propyleneoxide units can be random or block-like, and the connection to Q over ethylene and propyleneoxide units can take place via a carbon atom.

The branching unit $V^3$ may contain a tri- or higher-valent organopolysiloxane unit, such as, for example:

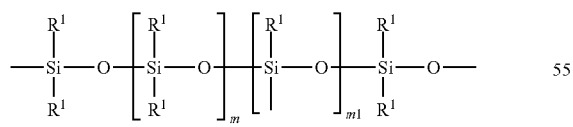

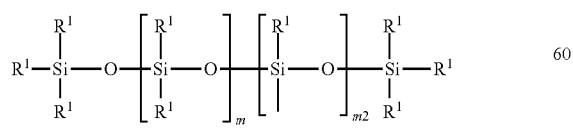

wherein $R^1$ is as defined above, m=0 to 1000, preferably 0 to 50 and $m^1 \geq 1$ and $m^2 \geq 3$,

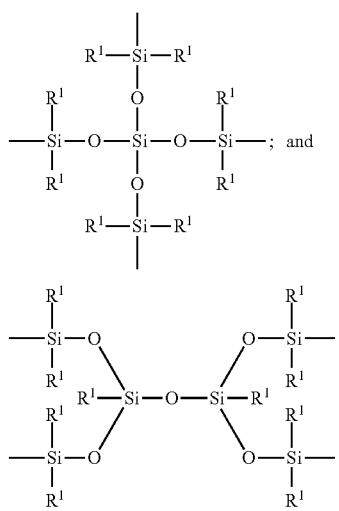

wherein $R^1$ is in each case defined as above.

An example of a $Z^3$-containing branching unit $V^3$ is, for instance:

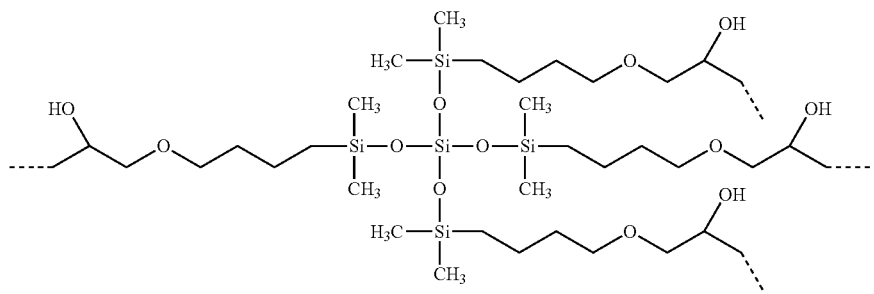

The polysiloxanes according to the invention can contain units $R^O$, which are preferably integrated into the polymer by suitable alkylation reactions of primary, secondary or tertiary monoamino-functionalized polyalkyleneoxides with reactively functionalized siloxane precursors. The monoprimary functionalized Jeffamine® of the M series (Huntsman Corp.) are preferably used.

Monofunctionally bonded hydrophilic elements $R^O$ can be introduced into the polysiloxane copolymers according to the invention in order to specifically enhance hydrophilicity.

This leads to both an enhanced hydrophilicity of the polysiloxane copolymers themselves, so that, for example, more stable emulsions in water are produced, as well as to an enhancement of hydrophilicity of the substrates treated with the polysiloxane copolymers according to the invention, which leads, for example, to an improved moisture absorption.

Furthermore, it lies within the scope of the invention to introduce reactive units into the copolymer main chain. Such reactive groups include groups of the following formulae:

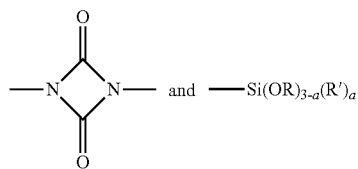

wherein 'a' is an integer from 0 to 2, and R and R' may be the same or different from each other, and each represent an organic residue. The reactive groups mentioned can be introduced, according to the invention, via units corresponding to V or Q, as is described in more detail in PCT/EP 2004/050472.

The polyamino and/or polyammonium-polysiloxane-copolymer compounds according to the invention can be solid or liquid at 25° C. In case they are liquid at 25° C., the viscosities of the polysiloxanes mentioned preferably are between 500 to 50,000,000 mPa·s at 25 ° C., preferably 1000 to 2,500,000 mPa·s at 25 ° C. and a shear rate gradient of D=1 $s^{-1}$.

The invention further relates to the aqueous emulsions that comprise at least one polyamino and/or polyammonium-polysiloxane-copolymer compound and their use for the first finishing of fiber materials. Such aqueous emulsions are prepared by dispersing the polyamino and/or polyammonium-polysiloxane-copolymer compounds or, optionally, alcoholic solutions, with conventional emulsifying devices, such as rotor stator mixers, simple stirrers and mixing nozzles and gaulin emulsifying machines, optionally in the presence of one or more surfactants. Preferably, concentrates are produced first, which are then diluted to the preferred application concentrations.

Concentration Ranges of the Concentrates are, for Example:

| Constituent | Concentrations |
| --- | --- |
| Polyamino and/or polyammonium-polysiloxane-copolymer compounds | 10 to 40% by wt. |
| Emulsifiers | 0.5 to 20% by wt. |
| Water and optionally organic solvents | Remainder |

Concentration Ranges of the Application Emulsions are, for Example:

| Constituent | Concentrations |
| --- | --- |
| Polyamino and/or polyammonium-polysiloxane-copolymer compounds | 1 to 10% by wt. |
| Emulsifiers | 0.05 to 5% by wt. |
| Water and optionally organic solvents | Remainder |

Surfactants that Can be Applied Include:

Preferably silicone-free, preferably cationic or non-ionic surfactants. The application of anionic surfactants is possible in principle, but less preferred. The preferred cationic surfactants are at least one constituent selected from non-polymerized, organic, quaternary ammonium compounds. Preferably, they are hydrocarbon group-containing quaternary ammonium salts or amine salts, wherein the hydrocarbon group can preferably contain 8 to 28 carbon atoms. Examples of non-ionic surfactants include: alkoxylated alcohols, ethyleneoxide (EO)-propyleneoxide (PO) block polymers, polyhydroxy fatty acid amides, alkylpolysaccharides and the like.

The non-aqueous carriers, which may be present in the emulsions in addition to water, can be, for example, organic solvents, preferably water-soluble organic solvents on their own and/or mixtures thereof, also with water. Preferred organic solvents include: monoalcohols, diols, polyols, such as glycerin, glycol, polyether, such as polyalkylene glycols, such as polyethylene glycol and mixtures thereof, also with water. Mixtures of solvents are particularly preferred, in particular mixtures of lower aliphatic alcohols, such as ethanol, propanol, butanol, isopropanol and/or diols, such as 1,2-propane diol or 1,3-propane diol, or mixtures thereof with glycerin. Suitable alcohols include, in particular, $C_1$-$C_4$-alcohols. 1,2-propane diol and water is preferred. The aqueous emulsion formulations can also contain further auxiliary substances in the amounts customary for these auxiliary substances. Auxiliary substances within the sense of the invention are, among others, levelling agents, wetting agents, lustring agents, fiber protecting agents, anti-slip agents and other auxiliary substances according to the state of the art. A good overview of the auxiliary substances according to the state of the art can be found in Chwala/Anger, Handbuch der Textilhilfsmittel, Verlag Chemie, Weinhein 1977. In addition, buffering systems for setting an optimal pH value during finishing can be worked in.

The invention further relates to the use of compositions comprising at least one polyamino and/or polyammonium-polysiloxane-copolymer compound with at least one further polydiorganosiloxane compound different therefrom. In particular such compounds that do not carry any amino and ammonium functions, such as PDMS oils, are possible as polydiorganosiloxane compounds different from the polyamino and/or polyammonium-polysiloxane-copolymer compounds.

The invention further relates to a method for the first finishing of fiber materials, comprising the treatment of the fiber materials with at least one polyamino and/or polyammonium-polysiloxane-copolymer compound as defined above or a composition as defined above, or an aqueous emulsion thereof. The finishing method can by carried out in particular according to the continuous process (Foulard or Lisseuse process) or the exhaustion process (jet process). Examples for the technological parameters to be adhered to in these finishing methods include:

Continuous (e.g. Foulard, Lisseuse)

| Finishing temperature: | Room temperature |
|---|---|
| Drying temperature: | 75-105° C. in the circulating-air drying cabinet or 10-60 sec on the tenter frame at 150° C., in particular 30-45 sec |
| Time in the circulating-air drying cabinet: | 10-20 minutes |

Exhaustion Process (e.g. Jet, Winch Back)

| Finishing temperature: | 30-60° C., preferably 35-50° C. and especially 35-45° C. |
|---|---|
| Heating rate: | 2-4° C./minute |
| Finishing time: | 15-25 minutes |
| Liquor ratio: | 1:5 to 1:50, in particular 1:10 to 1:30 |
| Drying temperature: | 75-105° C. in the circulating-air drying cabinet or 10-60 sec on the tenter frame at 150° C., in particular 30-45 sec |
| Time in the circulating-air drying cabinet: | 10-20 minutes |

The polyamino and/or polyammonium-polysiloxane-copolymer compounds used according to the invention or their compositions or aqueous emulsions are superbly suitable as textile softeners in finishing flat textiles, in particular those of cotton or mixtures of cotton with polyester, polyamide, polyacrylonitril, wool and silk. Flat textiles are preferably understood to be woven fabric, knitted fabric, knitted goods and nonwoven fabric. The use for finishing, according to the jet process, cotton or cotton-like textiles that have been pre-treated with anionic optical brighteners has proved to be particularly advantageous.

The invention further relates to the use of the compounds according to the invention for the first finishing and treatment of textiles and other natural and synthetic fibrous materials, inclusive of paper, hair and wool.

The invention and the effects achieved with it are illustrated by the following examples.

EXAMPLES

Example 1

Synthesis of a Chloroacetic Acid Ester
In analogy to Example 11 from WO 02/10257 the following ester is obtained from $HOCH_2CH_2OCH_2CH_2OH$ by reaction with chloroacetic acid chloride:

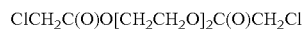

$ClCH_2C(O)O[CH_2CH_2O]_2C(O)CH_2Cl$

Example 2

Synthesis of a Long-Chained $Me_2SiO$-based Block Copolymer (Non-inventive)
In a 2 l three-necked flask,
800 g (0.1566 mol) of a siloxane peroxide of the structure

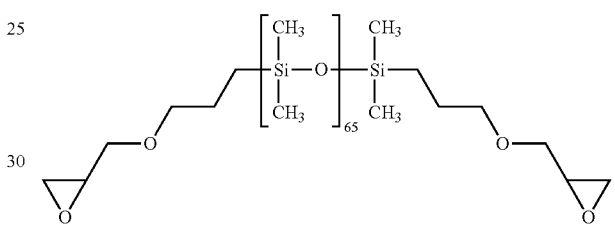

4.5 g (0.0174 mol) of the ester $ClCH_2C(O)O[CH_2CH_2O]_2C(O)CH_2Cl$,
30 g (0.174 mol) $(CH_3)_2N(CH_2)_6N(CH_3)_2$,
62.7 g (03132 mol) dodecanoic acid
24.9 g de-ionized water and
74.8 g dipropylene glycol monomethylether
are mixed with one another and heated to 100° C. for 9 hours. A viscous, clear, brown polymer solution is obtained.

Example 3

Synthesis of a Short-Chained D-Based Block Copolymer (According to the Invention)
In a 2 l three-necked flask,
1000 g (0.297 mol) of a siloxane peroxide of the structure

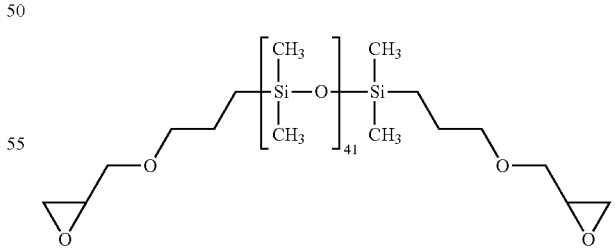

8.5 g (0.033 mol) of the ester $ClCH_2C(O)O[CH_2CH_2O]_2C(O)CH_2Cl$,
56.8 g (0.329 mol) $(CH_3)_2N(CH_2)_6N(CH_3)_2$,
118.8 g (0.593 mol) dodecanoic acid
39.5 g de-ionized water and
92.1 g dipropylene glycol
are mixed with one another and heated to 100° C. for 9 hours.

A viscous, very slightly opaque, brown polymer solution is obtained.

The polymers comprise the following structural elements

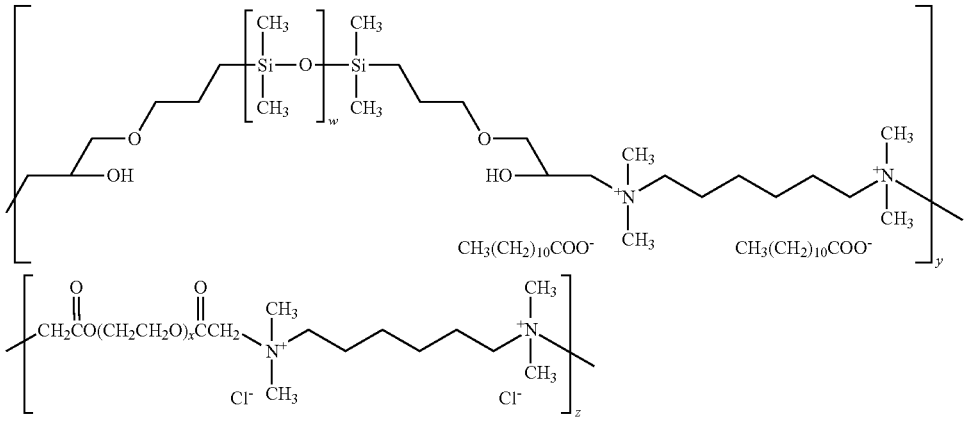

with

| Example | w | x | y | z |
|---|---|---|---|---|
| 2 | 65 | 2 | 0.9 | 0.1 |
| 3 | 41 | 2 | 0.9 | 0.1 |

Example 4

Preparation of Micro-emulsions, Textile Finishing, Washing Tests

The polymers according to examples 2 and 3 are transferred into 20% silicone-active micro-emulsions of the following composition:
22.2% polymer according to Example 2
3.8% emulsifier Imbentin T 060
2.2% emulsifier Imbentin T 120
71.8% water and
22.2% polymer according to Example 3
4.2% emulsifier Imbentin T 060
8.8% emulsifier Imbentin T 120
64.8% water
The micro-emulsions of the polymers 2 and 3 are diluted to 2%.
Then, cotton terry is finished with the micro-emulsions in the exhaustion process at 40° C. for 30 minutes. The amount of polymer used is 2 mg block copolymer/1 g cotton terry and 10 mg block copolymer/1 g cotton terry. The finished terry cloths are then dried at 130° C. for 10 minutes and divided into two parts.
The first feel and the hydrophilicity of the first part of the terry cloths is determined after 1 day of storage at 40% humidity. The determination of hydrophilicity is repeated after 7 days.
The second part of the terry cloths is subjected to 3 washing cycles in the presence of a reference laundry detergent based on anionic surfactants (40° C., 30 minutes, 0.1 g/l wfk-Ecolabel Reference Detergent Light Duty (wfk-Institut für Angewandte Forschung GmbH, Fichtenhain 11, D-47807 Krefeld); rinse for 5 minutes with tap water after each washing) and then stored for 1 day at 40% humidity.

The feel and hydrophilicity of the terry cloths after 3 washing cycles is also determined.
The following results were obtained:

| Micro-emuls. of Example | Feel after Finishing* | Hydrophilicity after Finishing (s)** 1 day | 7 days | Feel after 3 washings* | Hydrophilicity after 3 washings (s)** 1 day |
|---|---|---|---|---|---|
| 2 mg block copolymer/1 g cotton terry | | | | | |
| 3 | 1.75 | 2 | 4 | 1.53 | 1 |
| 2 | 1.25 | 2 | 5 | 1.47 | 1 |
| 10 mg block copolymer/1 g cotton terry | | | | | |
| 3 | 1.54 | 3 | 5 | 1.65 | 3 |
| 2 | 1.46 | 3 | 15 | 1.35 | 3 |

*The feel is determined 'head to head'. The better cloths get 2 points, the poorer cloth 1 point. The results of 5 test cloths, assessed by 4 persons, are averaged.
**10 drops of water (50 µl) are placed on a finished terry cloth, the times until they sink in are determined and averaged.

Overall Assessment:

The data show that the block copolymer according to the invention from Example 3, compared with the non-inventive block copolymer according to Example 3, has a better first feel already at a lower concentration (2 mg/g textile). At higher concentrations (10 mg/g textile), the non-inventive block copolymer is able to catch up with respect to the first feel; however, hydrophilicity after finishing becomes significantly worse for Example 2 under these conditions.

The invention claimed is:
1. A method of first finishing of a fiber material comprising applying to the fiber material a polyamino and/or polyammonium-polysiloxane-copolymer compounds comprising units of the formula (I):

—[Q-V]—         (I)

wherein Q is selected from the group consisting of:
—NR—,
—N⁺R₂—
a saturated or unsaturated diamino-functional heterocycle of the formulae:

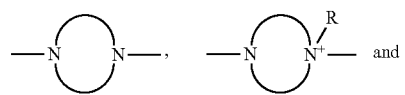

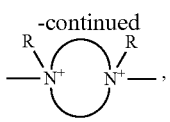

as well as an aromatic diamino-functional heterocycle of the formula:

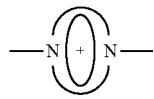

a trivalent residue of the formula:

a trivalent residue of the formula:

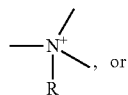, or a tetravalent residue of the formula:

wherein R respectively represents hydrogen or a monovalent organic residue,
wherein Q does not bond to a carbonyl carbon atom,
V is selected from the group consisting of $V^{11}$, $V^{12}$, $V^2$ and $V^3$, wherein
$V^2$ is selected from divalent, straight-chained, cyclic or branched, saturated, unsaturated or aromatic hydrocarbon residues with up to 1000 carbon atoms (wherein the carbon atoms of the polysiloxane residue $Z^2$ defined below are not included in this number), which may optionally contain one or more groups selected from
—O—,
—CONH—,

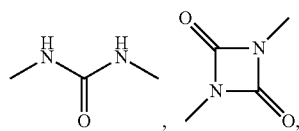

—CONR$^2$—, wherein
R$^2$ represents hydrogen, a monovalent, straight-chained, cyclic or branched, saturated, unsaturated or aromatic hydrocarbon residue with up to 100 carbon atoms, which may contain one or more groups selected from
—O—,
—NH—,
—C(O)— and
—C(S)—,
and which may optionally be substituted by one or more substituents selected from the group consisting of:
a hydroxyl group,
an optionally substituted heterocyclic group preferably containing one or more nitrogen atoms,
amino,
alkylamino,
dialkylamino,
ammonium,
polyether residues and
polyether ester residues,
wherein, if several groups —CONR$^2$ are present, they may be the same or different,
—C(O)— and
—C(S)—, and
the residue $V^2$ may optionally be substituted by one or more hydroxyl groups and/or by
—Si(OR)$_{3-a}$(R')$_a$
wherein a is an integer from 0 to 2, and R and R' may be the same or different from each other, and each represent an organic residue, and
the residue $V^2$ contains at least one group —$Z^2$— of the formula

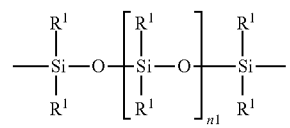

wherein
R$^1$ may be the same or different and is selected from the group consisting of:
$C_1$ to $C_{22}$-alkyl,
fluoro($C_1$-$C_{10}$)alkyl, $C_6$-$C_{10}$-aryl and
—W—Si(OR)$_{3-a}$(R')$_a$, wherein
R, R' and a are defined as above, and
W is
—O— or
a divalent, straight-chained or cyclic or branched, saturated, unsaturated or aromatic hydrocarbon residue with up to 100 carbon atoms, which may contain one or more groups
—C(O)—,
—O—,
—NH—, and
—S— and
may optionally be substituted by hydroxyl groups, and
$n_1$=20 to 52,
$V^{11}$ is selected from divalent, straight-chained, cyclic or branched, saturated, unsaturated or aromatic hydrocarbon residues with up to 1000 carbon atoms, which may optionally contain one or more groups selected from
—O—,
—CONH—,

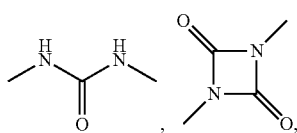

—CONR²—, wherein
R² is as defined above, wherein the groups R² in the groups V¹¹ and V² may be the same or different,
—C(O)—,
—C(S)— and
—Z¹—, wherein
—Z¹— is a group of the formula

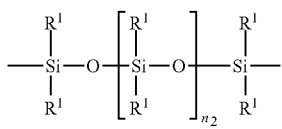

wherein
R¹ is as defined above, wherein the groups R¹ in the groups V¹¹ and V² may be the same or different, and $n_2$=0 to 19, and
the residue V¹¹ may optionally be substituted by one or more hydroxyl groups and/or by
—Si(OR)$_{3-a}$(R')$_a$
wherein a is an integer from 0 to 2, and R and R' may be the same or different from each other, and each represent an organic residue,
provided that the residue V¹¹ comprises (poly)alkyleneoxide units,
V¹² is selected from divalent, straight-chained, cyclic or branched, saturated, unsaturated or aromatic hydrocarbon residues with up to 1000 carbon atoms, which may optionally contain one or more groups selected from
—O—,
—CONH—,

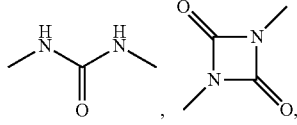

—CONR²—, wherein
R² is as defined above, wherein the groups R² in the groups V¹² and V² may be the same or different,
—C(O)—,
—C(S)— and
—Z¹—, wherein
—Z¹— is a group of the formula

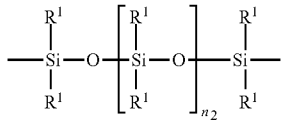

wherein
R¹ is as defined above, wherein the groups R¹ in the groups V¹² and V² may be the same or different, and $n_2$=0 to 19, and the residue V¹² may optionally be substituted by one or more hydroxyl groups and/or by
—Si(OR)$_{3-a}$(R')$_a$
wherein a is an integer from 0 to 2, and R and R' may be the same or different from each other, and each represent an organic residue,
provided that the residue V¹² comprises no (poly)alkyleneoxide units, and
V³ represents a tri- or higher-valent, straight-chained, cyclic or branched, saturated, unsaturated or aromatic hydrocarbon residue with up to 1000 carbon atoms, which may optionally contain one or more groups selected from
—O—,
—CONH—,

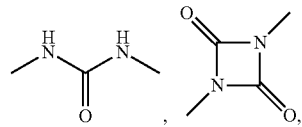

—CONR²—, wherein R² is as defined above,
—C(O)—,
—C(S)—,
—Z¹—, which is as defined above,
—Z²— which is as defined above, and
Z³, wherein Z³ is a tri- or higher-valent organopolysiloxane unit, and
which may optionally be substituted by one or more hydroxyl groups and/or by
—Si(OR)$_{3-a}$(R')$_a$
wherein a is an integer from 0 to 2, and R and R' may be the same or different from each other, and each represent an organic residue,
provided that
the polyamino and/or polyammonium-polysiloxane-copolymer compounds contain at least one residue V¹¹ and at least one residue V¹²,
the above-mentioned polyamino and/or polyammonium-polysiloxane-copolymer compounds contain at least one group —Z¹—, —Z²— or Z³, and
that the tri- and tetravalent residues Q either serve for branching the main chain formed from Q and V, so that the valences which do not serve for bonding in the main chain carry further branchings formed from -[Q-V]— units, or the tri- and tetravalent residues Q are saturated with residues V³ within a linear main chain without forming a branching, and
wherein the positive charges resulting from ammonium groups are neutralized by organic or inorganic acid anions,
wherein V comprises repeating units of the formula V¹¹, V¹² and V², wherein the polyamino and/or polyammonium-polysiloxane-copolymer compounds comprise the formula (III):

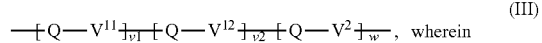 (III)

Q, V¹¹, V¹² and V² are defined as above and wherein v1 to v2 to w represent the molar ratio of the corresponding units -Q—V¹¹—, -Q—V¹²— and -Q—V²—, and wherein the molar ratio of w to v1 in mol-% is from 80 to 99, relative to the sum of w and v1.

2. The method of claim 1, wherein the molar ratio of v1 to v2 in mol-% is between 0 to 100.

3. The method of claim 1, wherein, on average, the polyamino and/or polyammonium-polysiloxane-copolymer compounds comprise at least two repeating units of the formula (I).

4. The method of claim 1, wherein the groups $V^{11}$ and $V^{12}$ are selected from divalent, straight-chained, cyclic or branched, saturated, unsaturated or aromatic hydrocarbon residues with up to 600 carbon atoms, which may optionally contain one or more groups selected from —O—, —CONH—, —CONR$^2$—, wherein R$^2$ is as defined above, —C(O)—, —C(S)— and —Z$^1$—, wherein —Z$^1$— is a group of the formula

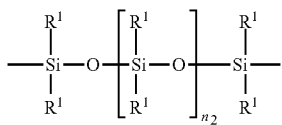

wherein
R$^1$ is $C_1$-$C_{18}$ alkyl, which may optionally be substituted with one or more fluorine atoms, or phenyl, and $n_2$ is as defined above, provided that the residue $V^{11}$ is a (poly)alkyleneoxide-containing residue and that the residue $V^{12}$ is a residue that contains no (poly)alkyleneoxide residue.

5. The method of claim 1, wherein the group $V^2$ is a group of the formula

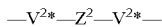
—$V^{2*}$—$Z^2$—$V^{2*}$— wherein $Z^2$ is as defined above and $V^{2*}$ represents a divalent, straight-chained, cyclic or branched, saturated, unsaturated or aromatic hydrocarbon residues with up to 40 carbon atoms, which may optionally contain one or more groups selected from —O—, —CONH—, —CONR$^2$—, wherein R$^2$ is as defined above, —C(O)— and —C(S)—, and the residue $V^{2*}$ may optionally be substituted by one or more hydroxyl groups.

6. The method of claim 1, wherein $V^{12}$ is selected from divalent, straight-chained, cyclic or branched, saturated, unsaturated or aromatic hydrocarbon residues with up to 100 carbon atoms, which may optionally contain one or more groups selected from
—$Z^1$—, wherein
—$Z^1$— is a group of the formula

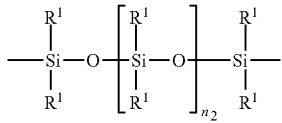

wherein
R$^1$ is as defined above, wherein the groups R$^1$ in the groups $V^{12}$ and $V^2$ may be the same or different, and
$n_2$=0 to 19, and
the residue $V^{12}$ may optionally be substituted by one or more hydroxyl groups and/or by
—Si(OR)$_{3-a}$(R')$_a$
wherein a is an integer from 0 to 2, and R and R' may be the same or different from each other, and each represent an organic residue.

7. The method of claim 1, wherein the group $V^{12}$ is a residue —R$^9$—, wherein R$^9$ represents a divalent, saturated or mono- or polyunsaturated, straight-chained or branched hydrocarbon residue with two to 25 carbon atoms.

8. The method of claim 1, wherein group $V^{11}$ is selected from
—(CH$_2$)$_u$C(O)O—[(CH$_2$CH$_2$O)$_q$—(CH$_2$CH(CH$_3$)O)$_r$]—C(O)(CH$_2$)$_u$—
—(CH$_2$)$_u$C(O)O—R$^9$—O—C(O)(CH$_2$)$_u$—, wherein R$^9$ is as defined above,
—[CH$_2$CH$_2$O]$_q$—[CH$_2$CH(CH$_3$)O]$_r$—CH$_2$CH$_2$—,
—CH(CH$_3$)CH$_2$O[CH$_2$CH$_2$O]$_q$—[CH$_2$CH(CH$_3$)O]$_r$—CH$_2$CH(CH$_3$)—
—CH$_2$CH(OH)CH$_2$OCH$_2$CH(OH)CH$_2$OCH$_2$CH(OH)CH$_2$— and
—CH$_2$CH(OH)CH$_2$O—[CH$_2$CH$_2$O]$_q$—[CH$_2$CH(CH$_3$)O]$_r$—CH$_2$CH(OH)CH$_2$—
wherein
u is 1 to 3,
q and r are each 0 to 5, and
q+r>0.

9. The method of claim 1, wherein group $V^{11}$ is selected from
—(CH$_2$)C(O)O—[(CH$_2$CH$_2$O)$_q$]—C(O)(CH$_2$)—
wherein q=1 or 2.

10. The method of claim 1, wherein at least one further polydiorganosiloxane compound different therefrom is applied.

11. The method of claim 1, wherein the fiber materials are selected from natural and synthetic fibrous materials including cellulose, wool, cotton, silk and synthetic fibers.

12. A method of finishing of a fiber material comprising applying to the fiber material a polyamino and/or polyammonium-polysiloxane-copolymer compounds comprising units of the formula (I):

-[Q—V]—           (I)

wherein Q is selected from the group consisting of:
—NR—,
—N$^+$R$_2$—
a saturated or unsaturated diamino-functional heterocycle of the formulae:

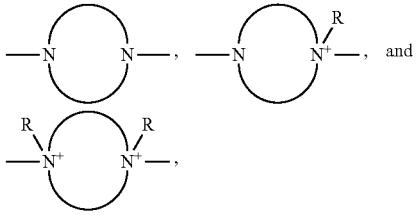

as well as an aromatic diamino-functional heterocycle of the formula:

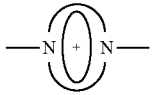

a trivalent residue of the formula:

a trivalent residue of the formula:

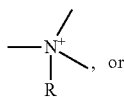, or a tetravalent residue of the formula:

wherein R respectively represents hydrogen or a monovalent organic residue,
wherein Q does not bond to a carbonyl carbon atom,
V is selected from the group consisting of $V^{11}$, $V^{12}$, $V^2$ and $V^3$, wherein
$V^2$ is selected from divalent, straight-chained, cyclic or branched, saturated, unsaturated or aromatic hydrocarbon residues with up to 1000 carbon atoms (wherein the carbon atoms of the polysiloxane residue $Z^2$ defined below are not included in this number), which may optionally contain one or more groups selected from
—O—,
—CONH—,

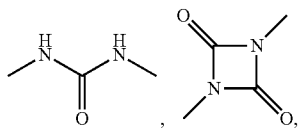

—CONR$^2$—, wherein
R$^2$ represents hydrogen, a monovalent, straight-chained, cyclic or branched, saturated, unsaturated or aromatic hydrocarbon residue with up to 100 carbon atoms, which may contain one or more groups selected from
—O—,
—NH—,
—C(O)— and
—C(S)—,
and which may optionally be substituted by one or more substituents selected from the group consisting of:
a hydroxyl group,
an optionally substituted heterocyclic group preferably containing one or more nitrogen atoms,
amino,
alkylamino,
dialkylamino,
ammonium,
polyether residues and
polyether ester residues,
wherein, if several groups —CONR$^2$ are present, they may be the same or different,
—C(O)— and
—C(S)—, and
the residue $V^2$ may optionally be substituted by one or more hydroxyl groups and/or by
—Si(OR)$_{3-a}$(R')$_a$ wherein a is an integer from 0 to 2, and R and R' may be the same or different from each other, and each represent an organic residue, and
the residue $V^2$ contains at least one group —$Z^2$— of the formula

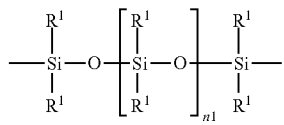

wherein
R$^1$ may be the same or different and is selected from the group consisting of:
$C_1$ to $C_{22}$-alkyl,
fluoro($C_1$-$C_{10}$)alkyl, $C_6$-$C_{10}$-aryl and
—W—Si(OR)$_{3-a}$(R')$_a$, wherein
R, R' and a are defined as above, and
W is
—O— or
a divalent, straight-chained or cyclic or branched, saturated, unsaturated or aromatic hydrocarbon residue with up to 100 carbon atoms, which may contain one or more groups
—C(O)—,
—O—,
—NH—, and
—S— and
may optionally be substituted by hydroxyl groups, and
$n_1$ =20 to 52,
$V^{11}$ is selected from the group consisting of
—(CH$_2$)$_u$C(O)O—[(CH$_2$CH$_2$O)$_q$—(CH$_2$CH(CH$_3$)O)$_r$]—C(O)(CH$_2$)$_u$—
—(CH$_2$)$_u$C(O)O—R$^9$—O—C(O)(CH$_2$)$_u$—, wherein R$^9$ is as defined above,
—[CH$_2$CH$_2$O]$_q$—[CH$_2$CH(CH$_3$)O]$_r$—CH$_2$CH$_2$—,
—CH(CH$_3$)CH$_2$O[CH$_2$CH$_2$O]$_q$—[CH$_2$CH(CH$_3$O]$_r$—CH$_2$CH(CH$_3$)—
—CH$_2$CH(OH)CH$_2$OCH$_2$CH(OH)CH$_2$OCH$_2$CH(OH)CH$_2$— and
—CH$_2$CH(OH)CH$_2$O—[CH$_2$CH$_2$O]$_q$—[CH$_2$CH(CH$_3$)O]$_r$—CH$_2$CH(OH)CH$_2$—
wherein
u is 1 to 3,
q and r are each 0 to 5, and
q+r>0,
$V^{12}$ is selected from divalent, straight-chained, cyclic or branched, saturated, unsaturated or aromatic hydrocarbon residues with up to 1000 carbon atoms, which may optionally contain one or more groups selected from
—O—,
—CONH—,

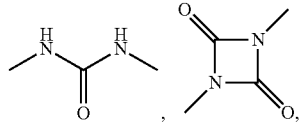

—CONR$^2$—, wherein
R$^2$ is as defined above, wherein the groups R$^2$ in the groups $V^{12}$ and $V^2$ may be the same or different, —C(O)—,
—C(S)— and
—$Z^1$—, wherein
—$Z^1$— is a group of the formula

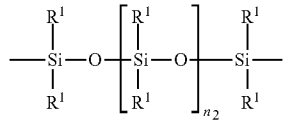

wherein
$R^1$ is as defined above, wherein the groups $R^1$ in the groups $V^{12}$ and $V^2$ may be the same or different, and $n_2$=0 to 19, and
the residue $V^{12}$ may optionally be substituted by one or more hydroxyl groups and/or by
—Si(OR)$_{3-a}$(R')$_a$
wherein a is an integer from 0 to 2, and R and R' may be the same or different from each other, and each represent an organic residue,
provided that the residue $V^{12}$ comprises no (poly)alkyleneoxide units, and
$V^3$ represents a tri- or higher-valent, straight-chained, cyclic or branched, saturated, unsaturated or aromatic hydrocarbon residue with up to 1000 carbon atoms, which may optionally contain one or more groups selected from
—O—,
—CONH—,

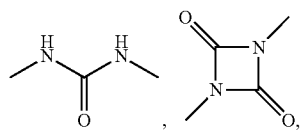

—CONR$^2$—, wherein $R^2$ is as defined above,
—C(O)—,
—C(S)—,
—$Z^1$—, which is as defined above,
—$Z^2$— which is as defined above, and
$Z^3$, wherein $Z^3$ is a tri- or higher-valent organopolysiloxane unit, and
which may optionally be substituted by one or more hydroxyl groups and/or by
—Si(OR)$_{3-a}$(R')$_a$
wherein a is an integer from 0 to 2, and R and R' may be the same or different from each other, and each represent an organic residue,
provided that
the polyamino and/or polyammonium-polysiloxane-copolymer compounds contain at least one residue $V^{11}$ and at least one residue $V^{12}$,
the above-mentioned polyamino and/or polyammonium-polysiloxane-copolymer compounds contain at least one group —$Z^1$—, —$Z^2$—or $Z^3$, and
that the tri- and tetravalent residues Q either serve for branching the main chain formed from Q and V, so that the valences which do not serve for bonding in the main chain carry further branchings formed from -[Q-V]— units, or the tri- and tetravalent residues Q are saturated with residues $V^3$ within a linear main chain without forming a branching, and wherein the positive charges resulting from ammonium groups are neutralized by organic or inorganic acid anions,
wherein V comprises repeating units of the formula $V^{11}$, $V^{12}$ and $V^2$.

13. method of finishing of a fiber material comprising applying to the fiber material a polyamino and/or polyammonium-polysiloxane-copolymer compounds comprising units of the formula (I):

-[Q-V]—           (I)

wherein Q is selected from the group consisting of:
—NR—,
—N$^+$R$_2$—
a saturated or unsaturated diamino-functional heterocycle of the formulae:

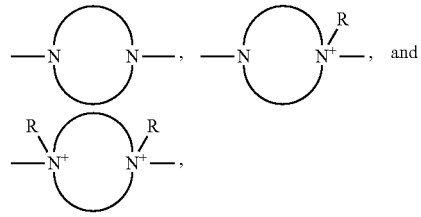

as well as an aromatic diamino-functional heterocycle of the formula:

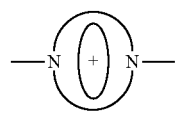

a trivalent residue of the formula:

a trivalent residue of the formula:

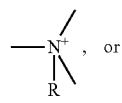

a tetravalent residue of the formula:

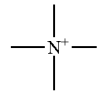

wherein R respectively represents hydrogen or a monovalent organic residue,
wherein Q does not bond to a carbonyl carbon atom,
V is selected from the group consisting of $V^{11}$, $V^{12}$, $V^2$ and $V^3$, wherein
$V^2$ is selected from divalent, straight-chained, cyclic or branched, saturated, unsaturated or aromatic hydrocarbon residues with up to 1000 carbon atoms (wherein the carbon atoms of the polysiloxane residue $Z^2$ defined below are not included in this number), which may optionally contain one or more groups selected from
—O—,
—CONH—,

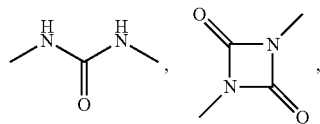

—CONR$^2$—, wherein
  R$^2$ represents hydrogen, a monovalent, straight-chained, cyclic or branched, saturated, unsaturated or aromatic hydrocarbon residue with up to 100 carbon atoms, which may contain one or more groups selected from
  —O—,
  —NH—,
  —C(O)— and
  —C(S)—,
  and which may optionally be substituted by one or more substituents selected from the group consisting of:
    a hydroxyl group,
    an optionally substituted heterocyclic group preferably containing one or more nitrogen atoms,
    amino,
    alkylamino,
    dialkylamino,
    ammonium,
    polyether residues and
    polyether ester residues,
  wherein, if several groups —CONR$^2$ are present, they may be the same or different,
—C(O)— and
—C(S)—, and
the residue V$^2$ may optionally be substituted by one or more hydroxyl groups and/or by
—Si(OR)$_{3-a}$(R')$_a$
wherein a is an integer from 0 to 2, and R and R' may be the same or different from each other, and each represent an organic residue, and
the residue V$^2$ contains at least one group —Z$^2$— of the formula

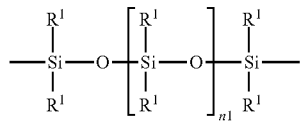

wherein
R$^1$ may be the same or different and is selected from the group consisting of:
  C$_1$ to C$_{22}$-alkyl,
  fluoro(C$_1$—C$_{10}$)alkyl, C$_6$—C$_{10}$-aryl and
  —W—Si(OR)$_{3-a}$(R')$_a$, wherein
    R, R' and a are defined as above, and
    W is
      —O— or a divalent, straight-chained or cyclic or branched, saturated, unsaturated or aromatic hydrocarbon residue with up to 100 carbon atoms, which may contain one or more groups
—C(O)—,
—O—,
—NH—, and
—S— and
may optionally be substituted by hydroxyl groups, and
$n_1$=20 to 52,
V$^{11}$ is selected from the group consisting of
—(CH$_2$)$_u$C(O)O—[(CH$_2$CH$_2$O)$_q$—(CH$_2$CH(CH$_3$)O)$_r$]
  —C(O)(CH$_2$)$_u$—
—(CH$_2$)$_u$C(O)O—R$^9$—O—C(O)(CH$_2$)$_u$—, wherein R$^9$ is as defined above,
—[CH$_2$CH$_2$O]$_q$—[CH$_2$CH(CH$_3$)O]$_r$—CH$_2$CH$_2$—,
—CH(CH$_3$)CH$_2$O[CH$_2$CH$_2$O]$_q$—[CH$_2$CH(CH$_3$)O]—CH$_2$CH(CH$_3$)—
—CH$_2$CH(OH)CH$_2$OCH$_2$CH(OH)CH$_2$OCH$_2$CH(OH)CH$_2$— and
—CH$_2$CH(OH)CH$_2$O—[CH$_2$CH$_2$O]$_q$—[CH$_2$CH(CH$_3$)O]$_r$—CH$_2$CH(OH)CH$_2$—
wherein
u is 1 to 3,
q and r are each 0 to 5, and
q +r>0,
V$^{12}$ is selected from divalent, straight-chained, cyclic or branched, saturated, unsaturated or aromatic hydrocarbon residues with up to 1000 carbon atoms, which may optionally contain one or more groups selected from
—O—,
—CONH—,

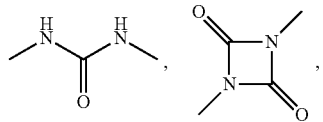

—CONR$^2$—, wherein
  R$^2$ is as defined above, wherein the groups R$^2$ in the groups V$^{12}$ and V$^2$ may be the same or different,
—C(O)—,
—C(S)— and
—Z$^1$—, wherein
  —Z$^1$— is a group of the formula

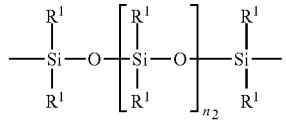

wherein
R$^1$ is as defined above, wherein the groups R$^1$ in the groups V$^{12}$ and V$^2$ may be the same or different, and
$n_2$=0 to 19, and
the residue V$^{12}$ may optionally be substituted by one or more hydroxyl groups and/or by
—Si(OR)$_{3-a}$(R')$_a$
wherein a is an integer from 0 to 2, and R and R' may be the same or different from each other, and each represent an organic residue, provided that the residue $V^{12}$ comprises no (poly)alkyleneoxide units, and $V^3$ represents a tri- or higher-valent, straight-chained, cyclic or branched, saturated, unsaturated or aromatic hydrocarbon residue with up to 1000 carbon atoms, which may optionally contain one or more groups selected from
—O—,
—CONH—,

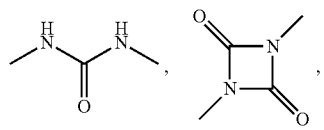

—CONR$^2$—, wherein R$^2$ is as defined above,
—C(O)—,
—C(S)—,
—Z$^1$—, which is as defined above,
—Z$^2$— which is as defined above, and
Z$^3$, wherein Z$^3$ is a tri- or higher-valent organopolysiloxane unit, and which may optionally be substituted by one or more hydroxyl groups and/or by
—Si(OR)$_{3-a}$(R')$_a$ wherein a is an integer from 0 to 2, and R and R' may be the same or different from each other, and each represent an organic residue, provided that the polyamino and/or polyammonium-polysiloxane-copolymer compounds contain at least one residue $V^{11}$ and at least one residue $V^{12}$, the above-mentioned polyamino and/or polyammonium-polysiloxane-copolymer compounds contain at least one group —Z$^1$—, —Z$^2$— or Z$^3$, and that the tri- and tetravalent residues Q either serve for branching the main chain formed from Q and V, so that the valences which do not serve for bonding in the main chain carry further branchings formed from -[Q-V]— units, or the tri- and tetravalent residues Q are saturated with residues V$^3$ within a linear main chain without forming a branching, and wherein the positive charges resulting from ammonium groups are neutralized by organic or inorganic acid anions, wherein the polyamino and/or polyammonium-polysiloxane-copolymer compounds comprise the formula (III):

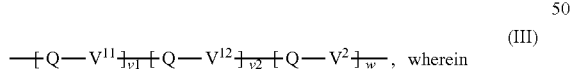, wherein (III)

Q, $V^{11}$, $V^{12}$ and $V^2$ are defined as above, and wherein v1 to v2 to w represent the molar ratio of the corresponding units -Q-$V^{11}$—,-Q-$V_{12}$— and -Q-$V^2$—.

14. The method of claim 13, wherein the molar ratio of w to v1 in mol-% is from 80 to 99, relative to the sum of w and v1.

15. Polyamino and/or polyammonium-polysiloxane-copolymer compounds comprising units of the formula (I):

-[Q-V]— (I)

wherein Q is selected from the group consisting of:
—NR—,
—N$^+$R$_2$— a saturated or unsaturated diamino-functional heterocycle of the formulae:

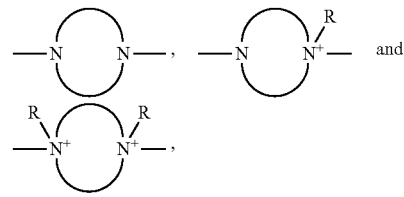

as well as an aromatic diamino-functional heterocycle of the formula:

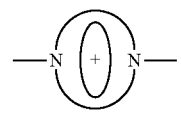

a trivalent residue of the formula:

a trivalent residue of the formula:

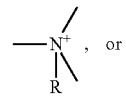, or a tetravalent residue of the formula:

wherein R respectively represents hydrogen or a monovalent organic residue, wherein Q does not bond to a carbonyl carbon atom, V is selected from the group consisting of $V^{11}$, $V^{12}$, $V^2$ and $V^3$, wherein $V^2$ is selected from divalent, straight-chained, cyclic or branched, saturated, unsaturated or aromatic hydrocarbon residues with up to 1000 carbon atoms (wherein the carbon atoms of the polysiloxane residue $Z^2$ defined below are not included in this number), which may optionally contain one or more groups selected from
—O—,
—CONH—,

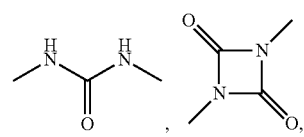

—CONR$^2$—, wherein
R$^2$ represents hydrogen, a monovalent, straight-chained, cyclic or branched, saturated, unsaturated or aromatic hydrocarbon residue with up to 100 carbon atoms, which may contain one or more groups selected from
—O—,
—NH—,
—C(O)— and
—C(S)—, and which may optionally be substituted by one or more substituents selected from the group consisting of:
a hydroxyl group,
an optionally substituted heterocyclic group preferably containing
one or more nitrogen atoms,
amino,
alkylamino,
dialkylamino,
ammonium,
polyether residues and
polyether ester residues,
wherein, if several groups —CONR$^2$ are present, they may be the same or different,
—C(O)— and
—C(S)—, and
the residue V$^2$ may optionally be substituted by one or more hydroxyl groups and/or by
—Si(OR)$_{3-a}$(R')$_a$
wherein a is an integer from 0 to 2, and R and R' may be the same or different from each other, and each represent an organic residue, and
the residue V$^2$ contains at least one group —Z$^2$— of the formula

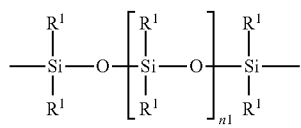

wherein
R$^1$ may be the same or different and is selected from the group consisting of:
C$_1$ to C$_{22}$-alkyl,
fluoro(C$_1$-C$_{10}$)alkyl, C$_6$-C$_{10}$-aryl and
—W—Si(OR)$_{3-a}$(R')$_a$, wherein
R, R' and a are defined as above, and
W is
—O— or
a divalent, straight-chained or cyclic or branched, saturated, unsaturated or aromatic hydrocarbon residue with up to 100 carbon atoms, which may contain one or more groups
—C(O)—,
—O—,
—NH—, and
—S— and
may optionally be substituted by hydroxyl groups, and
n$_1$=20 to 52,
V$^{11}$ is selected from divalent, straight-chained, cyclic or branched, saturated, unsaturated or aromatic hydrocarbon residues with up to 1000 carbon atoms, which may optionally contain one or more groups selected from
—O—,
—CONH—,

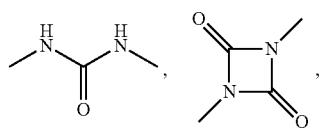

—CONR$^2$—, wherein
R$^2$ is as defined above, wherein the groups R$^2$ in the groups V$^{11}$ and V$^2$ may be the same or different,
—C(O)—,
—C(S)— and
—Z$^1$—, wherein
—Z$^1$— is a group of the formula

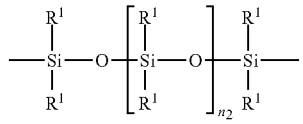

wherein
R$^1$ is as defined above, wherein the groups R$^1$ in the groups V$^{11}$ and V$^2$ may be the same or different, and
n$_2$=0 to 19, and
the residue V$^{11}$ may optionally be substituted by one or more hydroxyl groups and/or by
—Si(OR)$_{3-a}$(R')$_a$
wherein a is an integer from 0 to 2, and R and R' may be the same or different from each other, and each represent an organic residue,
provided that the residue V$^{11}$ comprises (poly)alkyleneoxide units,
V$^{12}$ is selected from divalent, straight-chained, cyclic or branched, saturated, unsaturated or aromatic hydrocarbon residues with up to 1000 carbon atoms, which may optionally contain one or more groups selected from
—O—,
—CONH—,

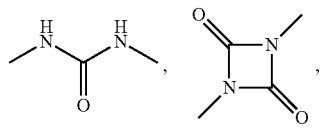

—CONR$^2$—, wherein
R$^2$ is as defined above, wherein the groups R$^2$ in the groups V$^{12}$ and V$^2$ may be the same or different,
—C(O)—,
—C(S)— and
—Z$^1$—, wherein
—Z$^1$— is a group of the formula

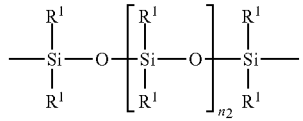

wherein
R$^1$ is as defined above, wherein the groups R$^1$ in the groups V$^{12}$ and V$^2$ may be the same or different, and
n$_2$=0 to 19, and the residue $V^{12}$ may optionally be substituted by one or more hydroxyl groups and/or by
—Si(OR)$_{3-a}$(R')$_a$
wherein a is an integer from 0 to 2, and R and R' may be the same or different from each other, and each represent an organic residue,
provided that the residue $V^{12}$ comprises no (poly)alkyleneoxide units, and
$V^3$ represents a tri- or higher-valent, straight-chained, cyclic or branched, saturated, unsaturated or aromatic hydrocarbon residue with up to 1000 carbon atoms, which may optionally contain one or more groups selected from
—O—,
—CONH—,

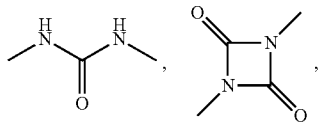

—CONR$^2$—, wherein R$^2$ is as defined above,
—C(O)—,
—C(S)—,
—Z$^1$—, which is as defined above,
—Z$^2$— which is as defined above, and
Z$^3$, wherein Z$^3$ is a tri- or higher-valent organopolysiloxane unit, and
which may optionally be substituted by one or more hydroxyl groups and/or by
—Si(OR)$_{3-a}$(R')$_a$
wherein a is an integer from 0 to 2, and R and R' may be the same or different from each other, and each represent an organic residue,
provided that
the polyamino and/or polyammonium-polysiloxane-copolymer compounds contain at least one residue $V^{11}$ and at least one residue $V^{12}$,
the above-mentioned polyamino and/or polyammonium-polysiloxane-copolymer compounds contain at least one group —Z$^1$—, —Z$^2$— or Z$^3$, and
that the tri- and tetravalent residues Q either serve for branching the main chain formed from Q and V, so that the valences which do not serve for bonding in the main chain carry further branchings formed from -[Q-V]— units, or the tri- and tetravalent residues Q are saturated with residues $V^3$ within a linear main chain without forming a branching, and
wherein the positive charges resulting from ammonium groups are neutralized by organic or inorganic acid anions, wherein V comprises repeating units of the formula $V^{11}$, $V^{12}$ and $V^2$, wherein the polyamino and/or polyammonium-polysiloxane-copolymer compounds comprise the formula (III):

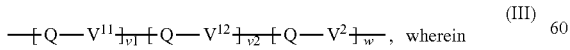 (III)

Q, $V^{11}$, $V^{12}$ and $V^2$ are defined as above, and wherein v1 to v2 to w represent the molar ratio of the corresponding units -Q-$V^{11}$—, -Q-$V^{12}$— and -Q-$V^2$—, and wherein the molar ratio of w to v1 in mol-% is from 80 to 99, relative to the sum of w and v1.

16. Polyamino and/or polyammonium-polysiloxane-copolymer compounds comprising units of the formula (I):

-[Q-V]— (I)

wherein Q is selected from the group consisting of:
—NR—,
—N$^+$R$_2$—
a saturated or unsaturated diamino-functional heterocycle of the formulae:

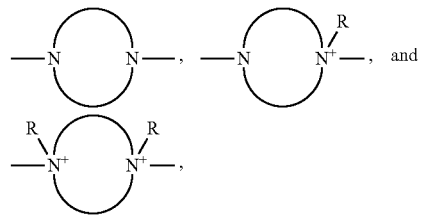

as well as an aromatic diamino-functional heterocycle of the formula:

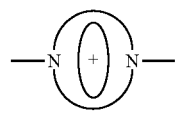

a trivalent residue of the formula:

a trivalent residue of the formula:

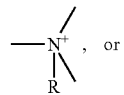

a tetravalent residue of the formula:

wherein R respectively represents hydrogen or a monovalent organic residue,
wherein Q does not bond to a carbonyl carbon atom,
V is selected from the group consisting of $V^{11}$, $V^{12}$, $V^2$ and $V^3$, wherein
$V^2$ is selected from divalent, straight-chained, cyclic or branched, saturated, unsaturated or aromatic hydrocarbon residues with up to 1000 carbon atoms (wherein the carbon atoms of the polysiloxane residue $Z^2$ defined below are not included in this number), which may optionally contain one or more groups selected from
—O—,
—CONH—,

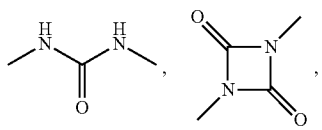

—CONR², wherein
R² represents hydrogen, a monovalent, straight-chained, cyclic or branched, saturated, unsaturated or aromatic hydrocarbon residue with up to 100 carbon atoms, which may contain one or more groups selected from
—O—,
—NH—,
—C(O)— and
—C(S)—,
and which may optionally be substituted by one or more substituents selected from the group consisting of:
a hydroxyl group,
an optionally substituted heterocyclic group preferably containing one or more nitrogen atoms,
amino,
alkylamino,
dialkylamino,
ammonium,
polyether residues and
polyether ester residues,
wherein, if several groups —CONR² are present, they may be the same or different,
—C(O)— and
—C(S)—, and
the residue V² may optionally be substituted by one or more hydroxyl groups and/or by
—Si(OR)$_{3-a}$(R')$_a$
wherein a is an integer from 0 to 2, and R and R' may be the same or different from each other, and each represent an organic residue, and
the residue V² contains at least one group —Z²— of the formula

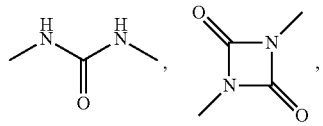

wherein
R¹ may be the same or different and is selected from the group consisting of:
$C_1$ to $C_{22}$-alkyl,
fluoro($C_1$-$C_{10}$)alkyl, $C_6$-$C_{10}$-aryl and
—W—Si(OR)$_{3-a}$(R')$_a$, wherein
R, R' and a are defined as above, and
W is
—O— or
a divalent, straight-chained or cyclic or branched, saturated, unsaturated or aromatic hydrocarbon residue with up to 100 carbon atoms, which may contain one or more groups
—C(O)—,
—O—,
—NH—, and
—S— and
may optionally be substituted by hydroxyl groups, and
$n_1$=20 to 52, V¹¹ is selected from the group consisting of
—(CH$_2$)$_u$C(O)O—[(CH$_2$CH$_2$O)$_q$—(CH$_2$CH(CH$_3$)O)$_r$]—C(O)(CH$_2$)$_u$—
—(CH$_2$)$_u$C(O)O—R⁹—O—C(O)(CH$_2$)$_u$—, wherein R⁹ is as defined above,
—[CH$_2$CH$_2$O]$_q$—[CH$_2$CH(CH$_3$)O]$_r$—CH$_2$CH$_2$—,
—CH(CH$_3$)CH$_2$O[CH$_2$CH$_2$O]$_q$—[CH$_2$CH(CH$_3$)O]$_r$—CH$_2$CH(CH$_3$)—
—CH$_2$CH(OH)CH$_2$OCH$_2$CH(OH)CH$_2$OCH$_2$CH(OH)CH$_2$— and
—CH$_2$CH(OH)CH$_2$O—[CH$_2$CH$_2$O]$_q$—[CH$_2$CH(CH$_3$)O]$_r$—CH$_2$CH(OH)CH$_2$—
wherein
u is 1 to 3,
q and r are each 0 to 5, and
q+r>0,
V¹² is selected from divalent, straight-chained, cyclic or branched, saturated, unsaturated or aromatic hydrocarbon residues with up to 1000 carbon atoms, which may optionally contain one or more groups selected from
—O—,
—CONH—,

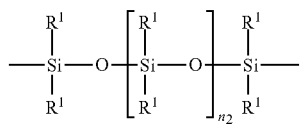

—CONR²—, wherein
R² is as defined above, wherein the groups R² in the groups V¹² and V² may be the same or different,
—C(O)—,
—C(S)— and
—Z¹, wherein
—Z¹— is a group of the formula

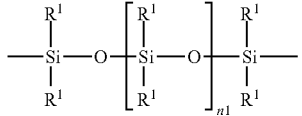

wherein
R¹ is as defined above, wherein the groups R¹ in the groups V¹² and V² may be the same or different, and
$n_2$=0 to 19, and
the residue V¹² may optionally be substituted by one or more hydroxyl groups and/or by
—Si(OR)$_{3-a}$(R')$_a$
wherein a is an integer from 0 to 2, and R and R' may be the same or different from each other, and each represent an organic residue,
provided that the residue V¹² comprises no (poly)alkyleneoxide units, and
V³ represents a tri- or higher-valent, straight-chained, cyclic or branched, saturated, unsaturated or aromatic hydrocarbon residue with up to 1000 carbon atoms, which may optionally contain one or more groups selected from
—O—,
—CONH—,

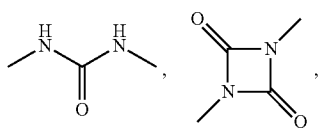

—CONR$^2$—, wherein R$^2$ is as defined above,
—C(O)—,
—C(S)—,
—Z$^1$—, which is as defined above,
—Z$^2$— which is as defined above, and
Z$^3$, wherein Z$^3$ is a tri- or higher-valent organopolysiloxane unit, and
which may optionally be substituted by one or more hydroxyl groups and/or by
—Si(OR)$_{3-a}$(R')$_a$
wherein a is an integer from 0 to 2, and R and R' may be the same or different from each other, and each represent an organic residue,
provided that
the polyamino and/or polyammonium-polysiloxane-copolymer compounds contain at least one residue V$^{11}$ and at least one residue V$^{12}$,
the above-mentioned polyamino and/or polyammonium-polysiloxane-copolymer compounds contain at least one group —Z$^1$—, —Z$^2$— or Z$^3$, and
that the tri- and tetravalent residues Q either serve for branching the main chain formed from Q and V, so that the valences which do not serve for bonding in the main chain carry further branchings formed from -[Q-V]— units, or the tri- and tetravalent residues Q are saturated with residues V$^3$ within a linear main chain without forming a branching, and
wherein the positive charges resulting from ammonium groups are neutralized by organic or inorganic acid anions, wherein V comprises repeating units of the formula V$^{11}$, V$^{12}$ and V$^2$.

17. An aqueous emulsion, comprising the polyamino and/or polyammonium-polysiloxane-copolymer compound of claim 16, and optionally one or more surfactants and optionally one or more nitrogen-free polysiloxane compounds.

18. A method of finishing of a fiber material comprising applying the aqueous emulsion of claim 17 to the fiber material.

\* \* \* \* \*